US012705813B2

(12) United States Patent
Montemont

(10) Patent No.: US 12,705,813 B2
(45) Date of Patent: Aug. 11, 2026

(54) METHOD FOR FORMING AND PROCESSING A GAMMA IMAGE

(71) Applicant: COMMISSARIAT A L'ENERGIE ATOMIQUE ET AUX ENERGIES ALTERNATIVES, Paris (FR)

(72) Inventor: Guillaume Montemont, Grenoble cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 232 days.

(21) Appl. No.: 18/723,966

(22) PCT Filed: Dec. 23, 2022

(86) PCT No.: PCT/EP2022/087830
§ 371 (c)(1),
(2) Date: Jun. 25, 2024

(87) PCT Pub. No.: WO2023/118609
PCT Pub. Date: Jun. 29, 2023

(65) Prior Publication Data

US 2025/0069292 A1 Feb. 27, 2025

(30) Foreign Application Priority Data

Dec. 26, 2021 (FR) ...................................... 2114529

(51) Int. Cl.
*G06T 12/30* (2026.01)

(52) U.S. Cl.
CPC .................................... *G06T 12/30* (2026.01)

(58) Field of Classification Search
None
See application file for complete search history.

(56) References Cited

U.S. PATENT DOCUMENTS

| | | | |
|---|---|---|---|
| 6,740,883 B1 | 5/2004 | Stodilka et al. | |
| 2008/0224061 A1 | 9/2008 | Smith | |
| 2010/0104505 A1 | 4/2010 | O'Connor | |
| 2020/0352527 A1* | 11/2020 | Hugg | A61B 6/037 |

FOREIGN PATENT DOCUMENTS

| | | |
|---|---|---|
| EP | 1 552 789 A2 | 7/2005 |
| WO | WO 2016/003957 A2 | 1/2016 |

OTHER PUBLICATIONS

International Search Report mailed on Apr. 6, 2023 in PCT/EP2022/087830 filed on Dec. 23, 2022 (3 pages).

* cited by examiner

*Primary Examiner* — Idowu O Osifade
(74) *Attorney, Agent, or Firm* — Oblon, McClelland, Maier & Neustadt, L.L.P.

(57) ABSTRACT

A method for obtaining and processing an image acquired by a gamma camera, the gamma camera comprising a detector configured to detect X-ray or gamma-ray photons emitted in a field of observation of the gamma camera, in order to obtain a reconstructed image. The reconstructed image corresponds to a position of radiation sources in the field of observation, the reconstructed image being liable to contain multiple regions of interest corresponding to hotspots. The method comprises selecting a region of interest so as to determine a probability of the hotspot being present in the selected region of interest.

11 Claims, 8 Drawing Sheets

METHOD FOR FORMING AND PROCESSING A GAMMA IMAGE

TECHNICAL FIELD

The technical field of the invention is X-ray or gamma-ray imaging, and more particularly the reconstruction of the position of radiation sources using an image acquired by a gamma camera.

PRIOR ART

Gamma cameras are devices that allow an image to be formed in order to establish a map of radiation sources in a given environment. A first application is location of a radiation source in an installation, and in particular in a nuclear installation. Another application is visualization of a radiation source in an organism, for medical diagnostic purposes.

Gamma cameras have been used in the medical field for a relatively long time. This type of device was developed for use in the nuclear industry in the 1990s, and used in nuclear installations for the purposes of radiological characterization. The objective is to identify the main radiation sources present in an installation. Specifically, radiation sources are not uniformly distributed. They are often concentrated locally, forming "hotspots" to use the term conventionally used in the field of radioprotection. A gamma camera has the benefit of locating these hotspots at distance.

A gamma camera comprises a detector, in which incident gamma-ray or X-ray photons interact. This thus yields an image acquired by the gamma camera, representative of the positions, in the detector, of interactions detected during an acquisition period.

Gamma cameras comprise a collimator, delimiting the field of observation.

The collimator may have parallel channels, in particular in the medical field: it is generally placed close to the organism under analysis. The collimator may be a pinhole collimator. With this type of gamma camera, the image formed by the gamma camera gives direct information about the position of radiation sources, without requiring implementation of a reconstruction algorithm. US2010/104505 describes this type of gamma camera. In that document, a thickness of a tumor is estimated taking into account background noise, in the image, detected in soft tissue surrounding the tumor. A region of interest is defined around the tumor.

The image formed by the gamma camera is subjected to a reconstruction to take into account the presence of the collimator and, more generally, the response function of the gamma camera. It is thus necessary to use a reconstruction algorithm, taking into account the response function of the gamma camera, to obtain a reconstructed image, representing a position of radiation sources in the field of observation. The field of observation is generally assimilated to a surface. The reconstructed image corresponds to a spatial distribution of the emission intensity of ionizing (X-ray or gamma-ray) photons on the surface. The collimator may be a pinhole, in which case the reconstruction image corresponds substantially to the image formed on the gamma camera.

The collimator may be a coded-aperture mask collimator, in which case the reconstruction image takes into account the geometry of the coded-aperture mask.

Some gamma cameras do not have a collimator, thereby giving them a wide field of observation, possibly of $4\pi$. These are in particular Compton gamma cameras, enabling emission points to be located based on detections of interactions resulting from Compton scattering in the detection material. In this case, the image acquired by the gamma camera is three-dimensional, and contains the 3D positions of simultaneous photon interactions during the acquisition period. The response function takes into account the positions of simultaneously detected interactions, along with the energy deposited in the detector in each interaction.

The inventor found that, regardless of the type of gamma camera, some hotspots, appearing in the reconstructed image, may result from reconstruction artifacts, or from the influence of radiation sources located outside the observed field. They may also be hotspots resulting from the detection of scattered radiation in or around the field of observation. Therefore, some hotspots appearing in the reconstructed image are not physically tangible. The invention described below addresses this problem by making it possible to assign a confidence level to each detected hotspot. The confidence level corresponds to a probability of the hotspot actually existing.

SUMMARY OF THE INVENTION

A first subject of the invention is a method for obtaining and processing an image acquired by a gamma camera, the gamma camera comprising a detector configured to detect X-ray or gamma-ray photons emitted in a field of observation of the gamma camera, the method comprising the following steps:

a) forming a gamma image using the gamma camera, the gamma image corresponding to positions of interactions detected by the detector in the course of an acquisition period;

b) based on the gamma image, taking into account a response function of the gamma camera to reconstruct an image, the reconstructed image being defined in pixels, each pixel corresponding to a position in the field of observation, the value of each pixel corresponding to a photon emission intensity at said position;

c) segmenting the reconstructed image into regions of interest, each region of interest comprising adjacent pixels the intensity of which is considered to be homogeneous, and greater than a background level of the reconstructed image, each region of interest defining a region of the reconstructed image corresponding to a radiation zone referred to as a hotspot;

d) selecting a region of interest from the regions of interest defined in c);

e) correcting the reconstructed image, within the region of interest selected in d), by replacing the value of the pixels with a predetermined value or a value representative of the background level of the reconstructed image;

f) using the response function of the gamma camera, and the corrected reconstructed image resulting from e), simulating a gamma image that would be acquired by the gamma camera in the absence of the hotspot in the selected region of interest;

g) using the response function of the gamma camera, simulating a gamma image acquired by the gamma camera based on the reconstructed image resulting from b);

h) comparing the gamma images resulting from f), g) and a) so as to determine a probability of the hotspot being present in the selected region of interest.

Step h) aims in particular to determine, from among the gamma images resulting from f) and g), the image closest to the image resulting from a), which corresponds to the measured gamma image.

According to one embodiment, step f) comprises the following sub-steps:

f-i) applying the response function of the gamma camera to the corrected reconstructed image, resulting from e), to obtain an estimate of the gamma image that would be acquired by the gamma camera in the absence of the hotspot in the selected region of interest;

f-ii) applying a registration to the image estimated in f-i) so as to obtain a registered image the total intensity of which is substantially equal to the intensity of the image acquired in step a), the registered image forming the gamma image that would be acquired by the gamma camera in the absence of the hotspot in the selected region of interest.

In sub-step f-ii), the registration may be carried out by applying a registration function to the image estimated in sub-step f-i). The registration function may be polynomial and parameterized by parameters, the value of the parameters being determined so as to minimize a difference between the registered image and the gamma image resulting from step a). The registration function may be a linear function parameterized by a gain parameter and a bias parameter.

Step h) may comprise:

- computing a discriminating factor, the discriminating factor corresponding to a comparison between:
  - the probability of obtaining the gamma image acquired in a) when the reconstructed image is the image obtained in step b);
  - the probability of obtaining the gamma image acquired in a) in the absence of the hotspot corresponding to the region of interest selected in c);
- computing the probability of the hotspot being present in the region of interest selected in c) based on the discriminating factor.

According to one embodiment:

- step c) comprises determining an intensity level in each region of interest;
- steps c) to h) are implemented successively, by successively selecting each region of interest in order of decreasing intensity level.

Another subject of the invention is a gamma camera, intended to detect the presence of radiation sources in a field of observation, the gamma camera comprising:

- a detector material, segmented into various pixels;
- a memory, configured to store a quantity of interactions detected in the course of an acquisition period and respectively assigned to each pixel;
- a processing unit, configured to process the interactions stored in the memory, the processing unit being configured to implement steps b) to h) of a method according to the first subject of the invention on the basis of the interactions detected and stored in the memory.

The gamma camera may in particular comprise a coded-aperture mask collimator defining the field of observation of the gamma camera.

The invention will be better understood on reading the description of the exemplary embodiments that are presented, in the rest of the description, with reference to the figures listed below.

FIGURES

FIG. 1 schematically shows a gamma camera.

Figure 3:
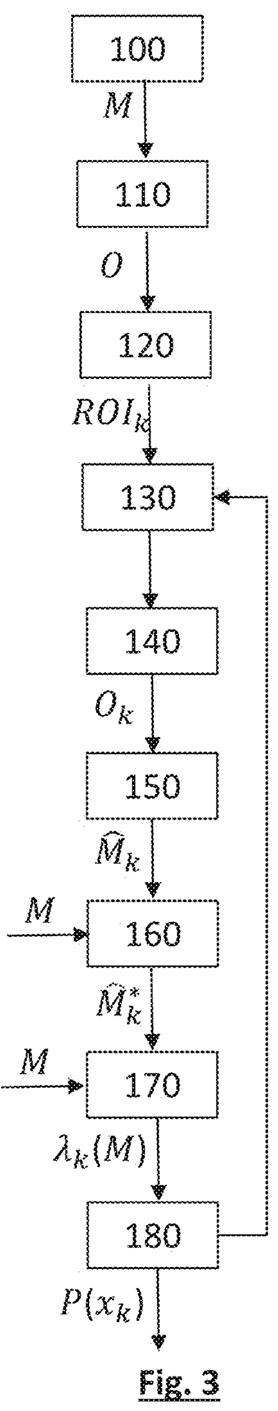

FIG. 3 schematically shows the main steps of a method for implementing the invention.

Figure 4A:
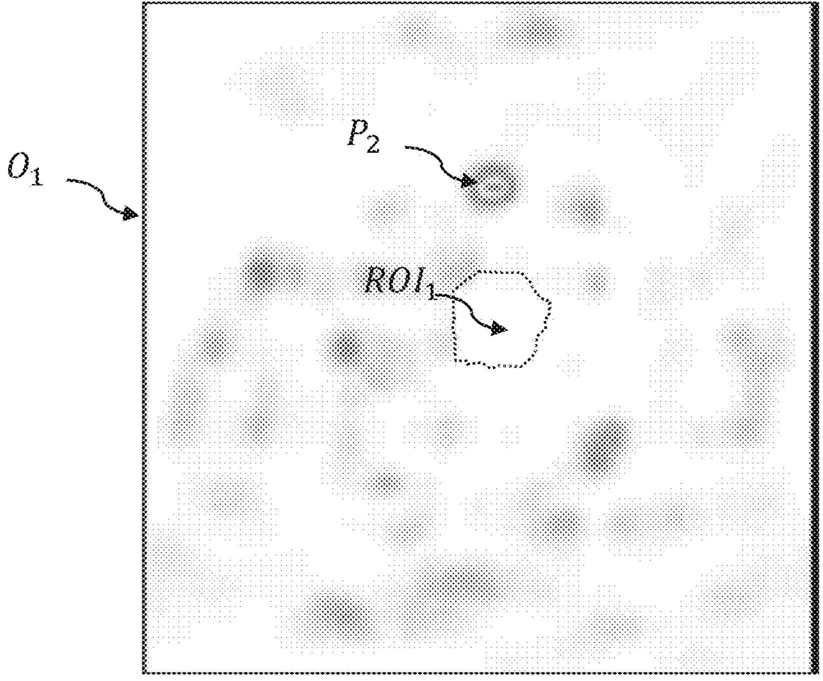

FIG. 4A shows one example of a constructed image corrected by removing a hotspot from the image 2B.

Figure 4B:
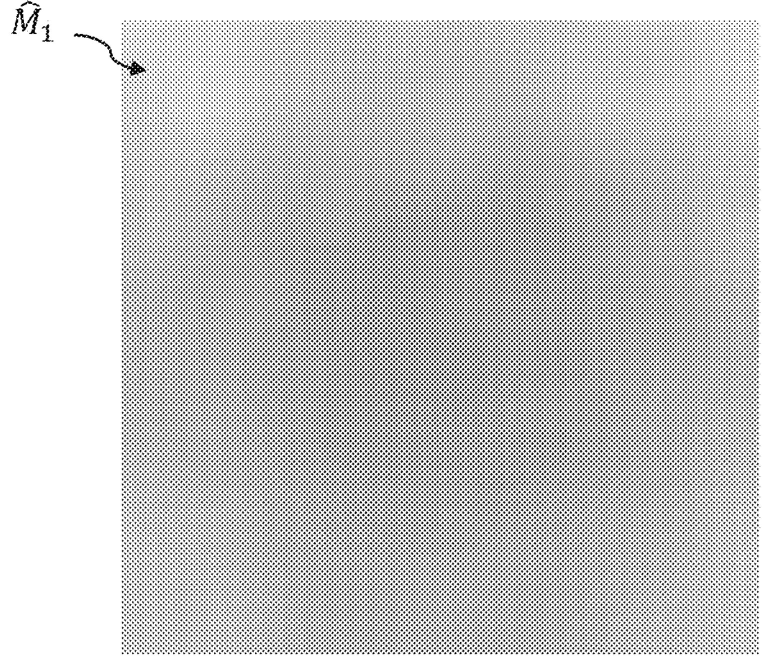

FIG. 4B is a simulation of an image acquired by the gamma camera when the corrected image of FIG. 4A corresponds to the field of observation.

Figure 2A:
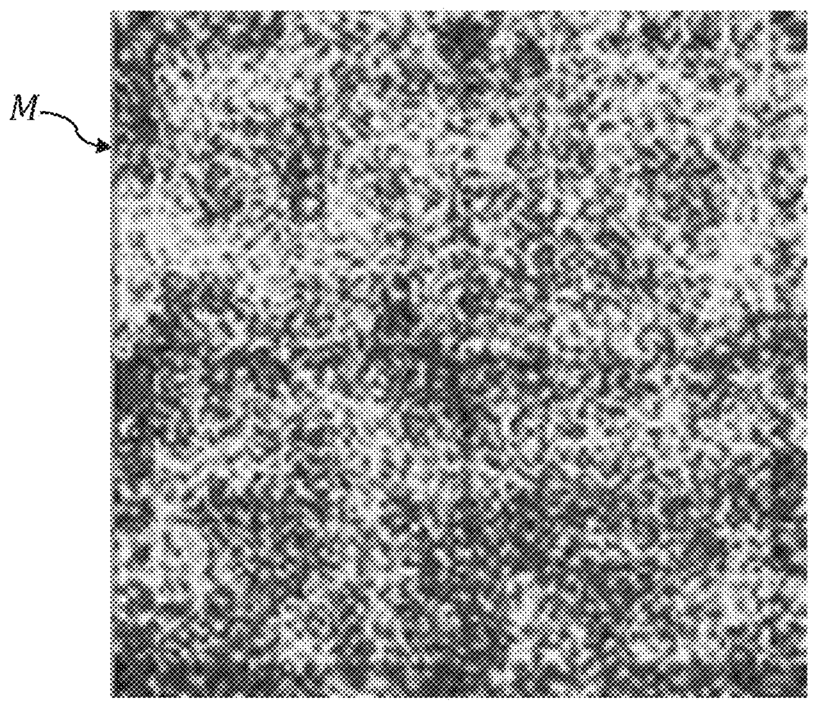
FIG. 2A shows an image acquired by a gamma camera.
Figure 2B:
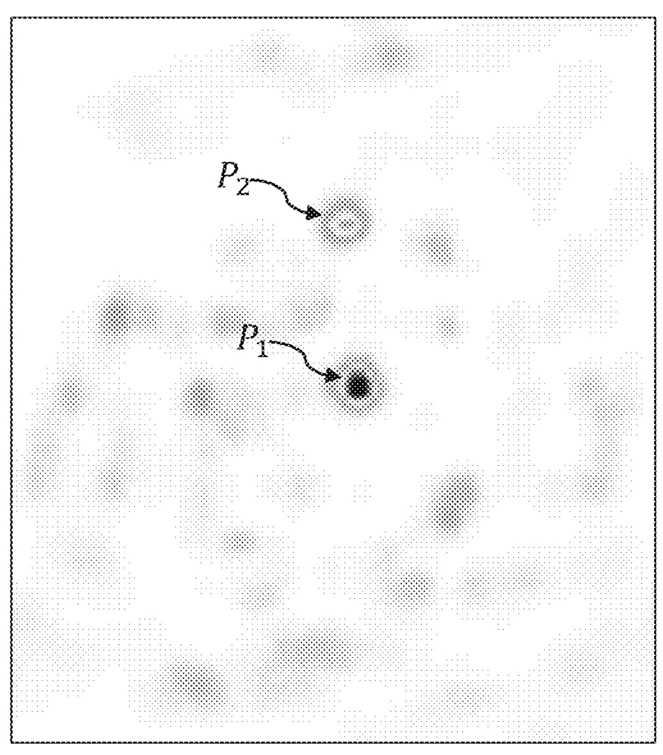
FIG. 2B is an image reconstructed based on the image of FIG. 2A.
Figure 4C:
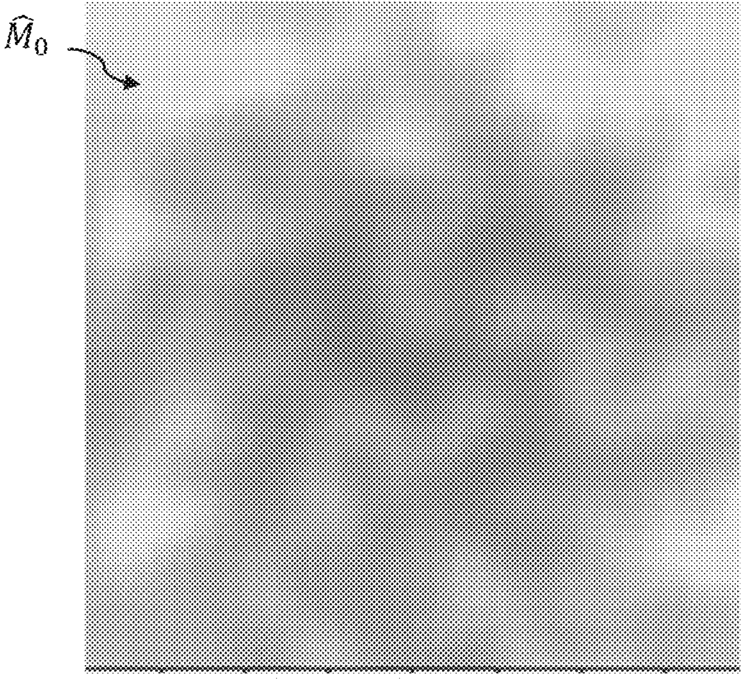

FIG. 4C is a simulation of the image acquired by the gamma camera when the image of FIG. 2B corresponds to the field of observation.

Figure 4D:
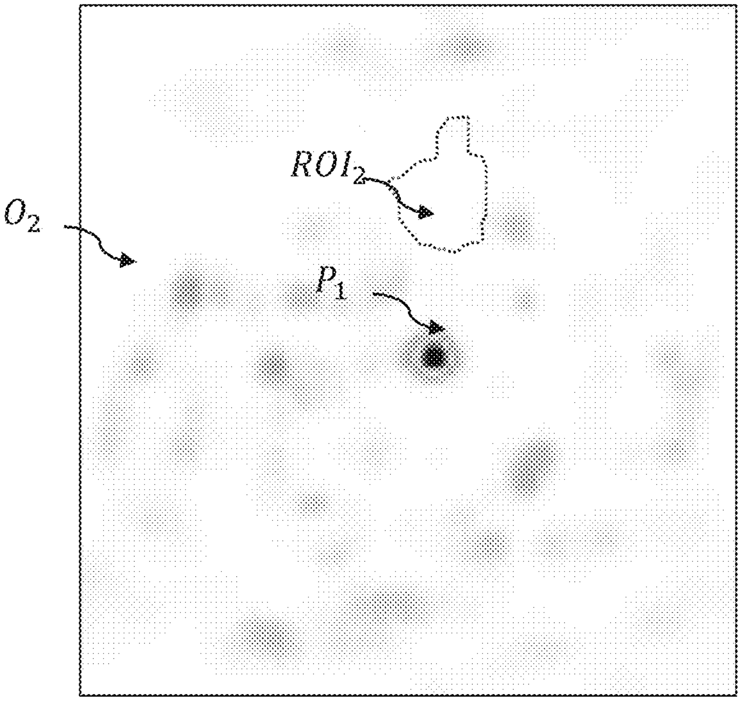

FIG. 4D shows one example of a constructed image corrected by removing another hotspot from the image 2B.

Figure 4E:
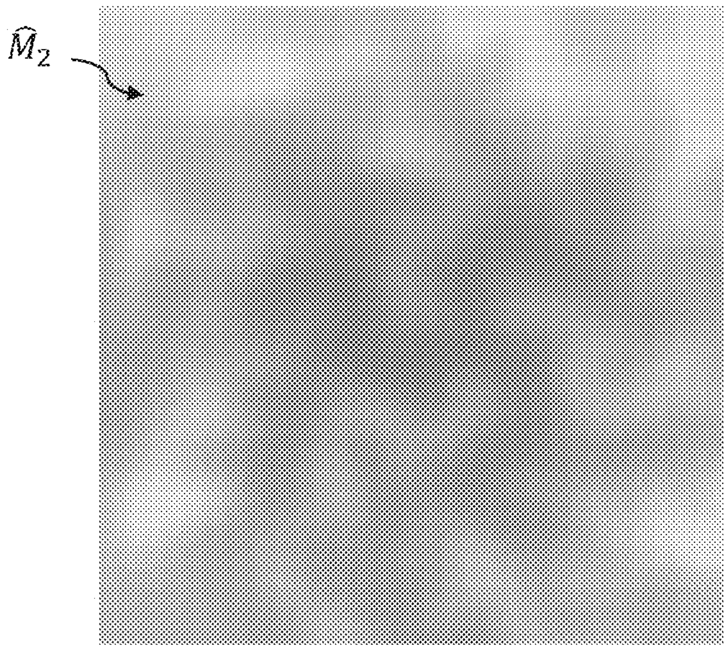

FIG. 4E is a simulation of the image acquired by the gamma camera when the image of FIG. 4D corresponds to the field of observation.

Figure 5:
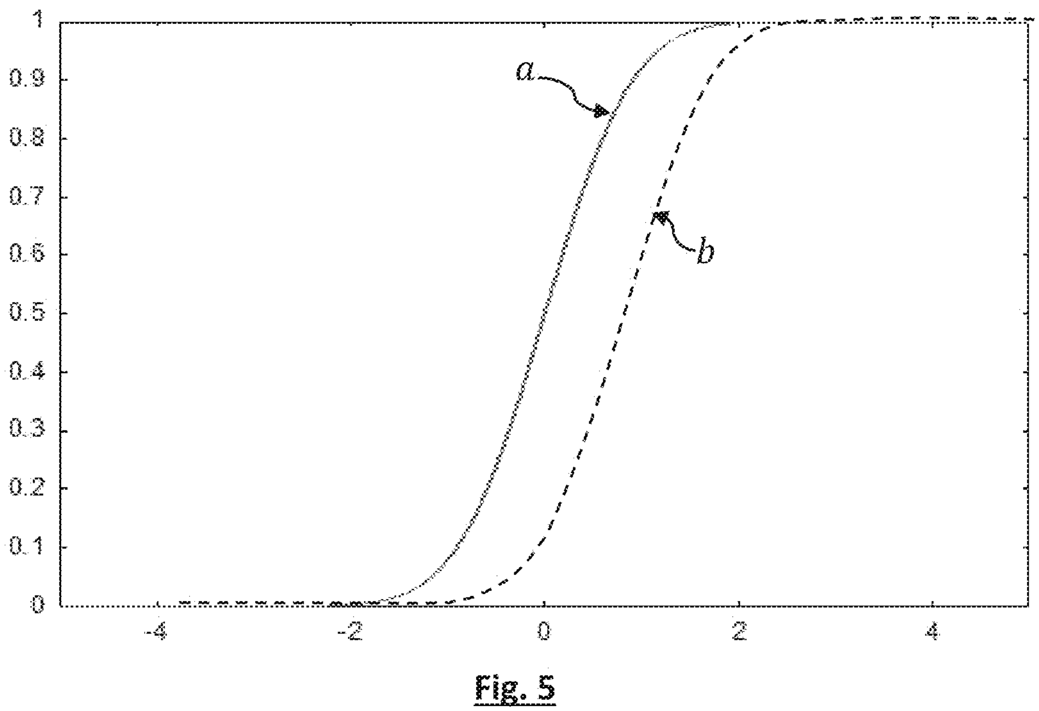

FIG. 5 shows determination of a probability associated with a hotspot.

Figure 6A:
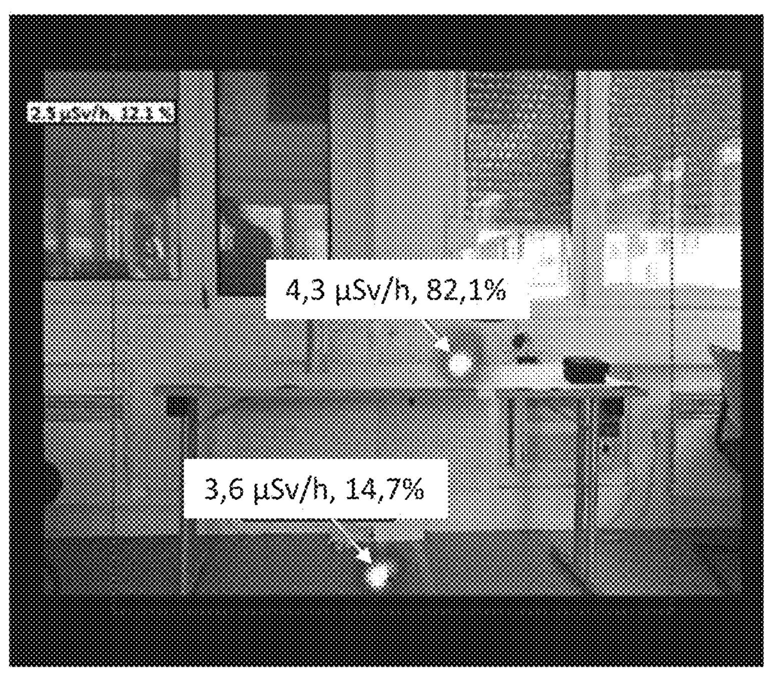
Figure 6B:
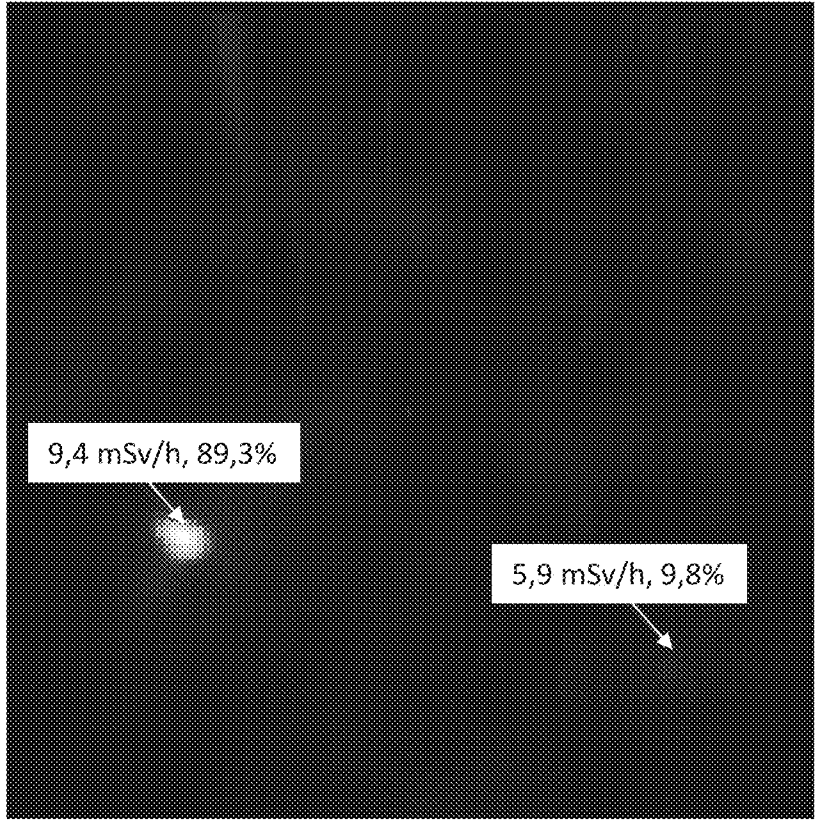
Figure 6C:
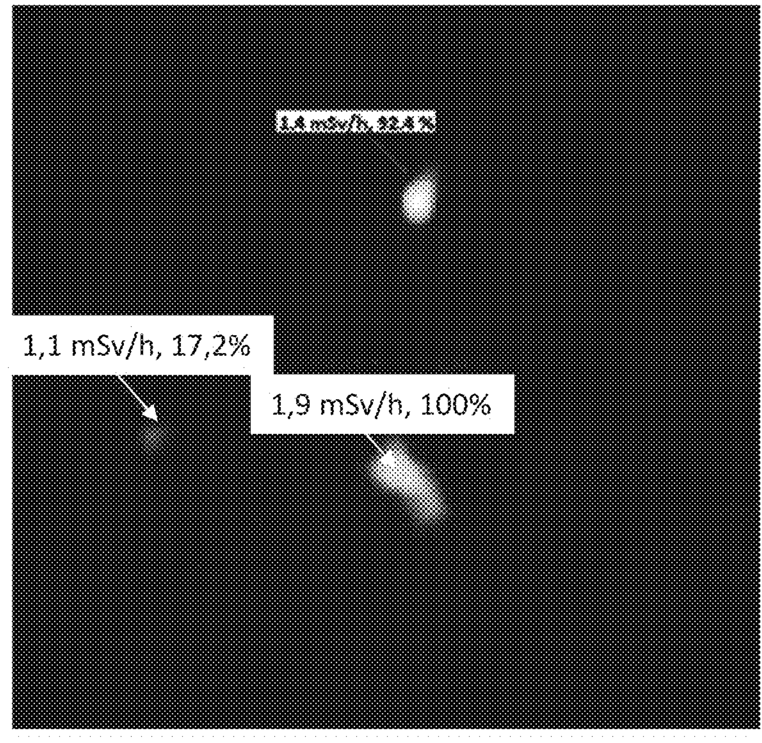

FIGS. 6A, 6B and 6C show exemplary implementations of the invention.

DESCRIPTION OF PARTICULAR EMBODIMENTS

Figure 1:
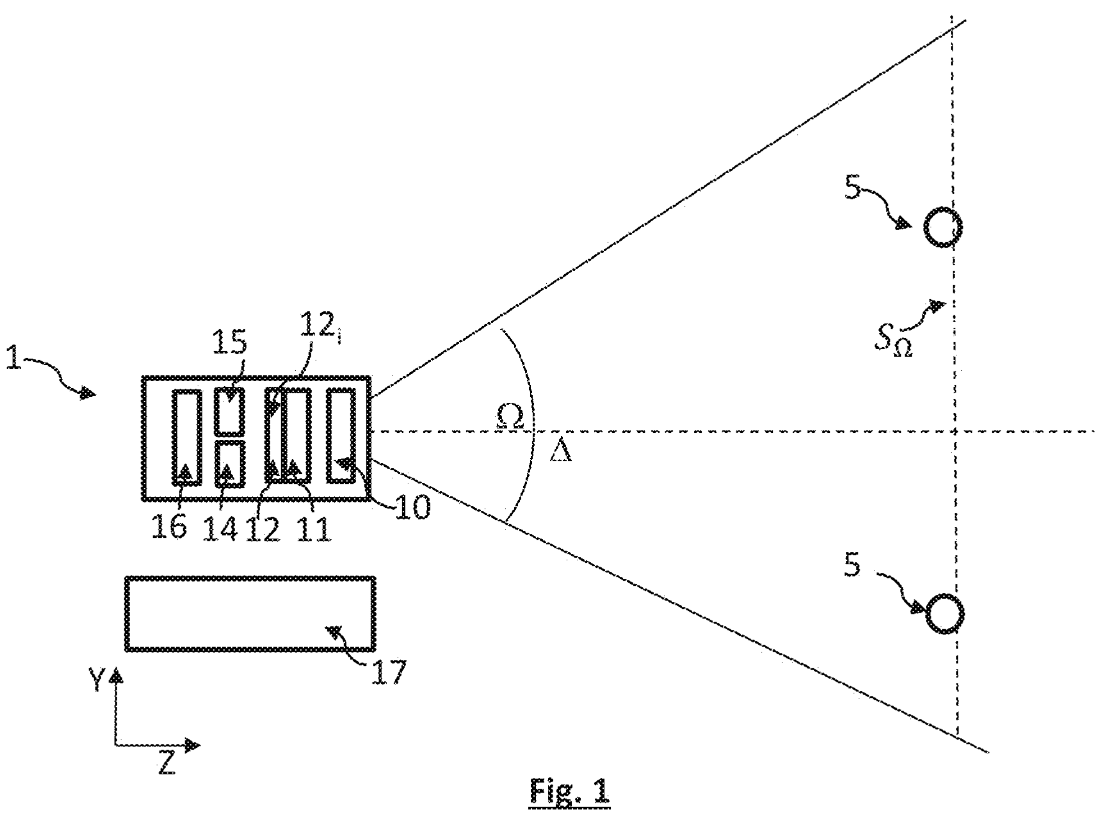

FIG. 1 shows a gamma camera 1, allowing the invention to be implemented. The gamma camera 1 is configured to detect, in a field of observation Ω, ionizing X-ray or gamma-ray photons, the energy of which is generally between 10 keV and 10 MeV. The field of observation Ω extends about a central axis Δ. The gamma camera 1 may be coupled to a visible camera, allowing a visible image of the field of observation to be formed. The term gamma camera corresponds to an imager having a field of observation and configured to form an object image O allowing radiation sources to be located in the field of observation Ω.

The gamma camera 1 comprises a detector material 11, usually a semiconductor material allowing charge carriers (electron/hole pairs) to be created during an interaction with X-rays or gamma radiation. It may for example be CdTe or CdZnTe. Generally, the detector material is prone to interact with ionizing photons, in such a way as to generate charge carriers. The detector material is preferably a semiconductor material. As an alternative, it may be a scintillator material coupled to a photodetector.

The gamma camera 1 comprises pixels $\mathbf{12}_i$ distributed over a detection surface 12. Generally, the pixels $\mathbf{12}_i$ are coplanar and distributed in a preferably regular two-dimensional matrix. The matrix may for example comprise a few tens or even hundreds or thousands of pixels. Each pixel $\mathbf{12}_i$ may be considered to be an elementary radiation detector.

In the example shown, the gamma camera comprises a collimator 10 for delimiting the field of observation Ω liable to contain radiation sources 5. The pixels are exposed to radiation, originating from the radiation sources in the field of observation, during an acquisition period. In the course of the acquisition period, the pixels acquire detection signals resulting from interactions of ionizing photons emitted by the radiation sources located in the field of observation. The collimator 10 may be a pinhole collimator or a coded-aperture mask. In the example shown, the collimator 10 is a coded-aperture mask. When the collimator is a coded-aperture mask, the response function of the gamma camera is such that radiation sources located at the edge of the field of observation may generate reconstruction artifacts. These artifacts may be assimilated to hotspots that do not actually exist. Therefore, the invention is particularly suitable for gamma cameras whose collimator is a coded-aperture mask collimator.

As an alternative, the gamma camera may be a Compton gamma camera, in which case the presence of a collimator is not necessary. A Compton gamma camera comprises a specific electronic circuit for estimating the respective positions, and the energies deposited, in the detector material, of two temporally coincident interactions, and for estimating a direction of propagation of the incident radiation.

Generally, each interaction gives rise to the formation of a detection signal by at least one pixel, more often than not by multiple pixels. The detection signal may be a signal resulting from the collection of charge carriers by the pixel 12, or a signal induced by the migration of charge carriers through the detector material 11. In order to improve the spatial resolution of the gamma image, the gamma camera may comprise a unit 14 for achieving sub-pixel resolution, said unit being programmed to assign, to each detected interaction, a position (x, y) parallel to the detection surface 12, on the basis of detection signals formed by multiple adjacent pixels 12: following each interaction. The unit 14 for achieving sub-pixel resolution divides each pixel 12: into virtual pixels, or sub-pixels. The term "virtual pixel" designates the fact that a virtual pixel is not physically tangible: it results from a virtual segmentation of each physical pixel $\mathbf{12}_i$. In the remainder of the description, the term pixel designates an elementary point of the gamma image, be this a physical pixel, in the absence of a unit for achieving sub-pixel resolution, or a virtual pixel, in the presence of such a unit.

Under the effect of collection of charge carriers, each pixel 12*i* generates a pulse the amplitude of which depends on the energy released, in the detector material, by an ionizing photon, in the course of an interaction, this energy usually being designated "interaction energy". Optionally and advantageously, the gamma camera 1 comprises a spectrometry unit 15. The spectrometry unit 15 allows the amplitude of the pulses resulting from the collection of charge carriers following an interaction to be estimated as precisely as possible. The spectrometry unit 15 may comprise both electronic means (pulse-forming circuit, multichannel analyzer, analog-to-digital converter) and software means. Estimating the amplitude of a pulse makes it possible to estimate interaction energy. This energy must be estimated as precisely as possible. The addressed energy range is generally between 10 keV and a few hundred keV, or even a few MeV. It is desirable for the precision of the energy to be of the order of 1% or less.

The spectrometry unit 15 thus makes it possible to obtain a spectrum of the radiation detected by each pixel. The spectrometry unit 15 makes it possible to select energy bands of interest, corresponding to unscattered photons, that is to say photons that have not been deviated since they were emitted by the radiation source. Each energy band E lies between E±δE. 2δE thus corresponds to the spectral width of each energy band. For example, 2δE=0.2 keV. One advantage of spectrometric gamma cameras is that knowledge of the energy of the detected photons makes it possible to identify isotopes responsible for the irradiation.

The gamma camera 1 comprises a memory 16 configured to store a quantity of interactions M(x, y) respectively assigned to each pixel of the gamma image of position (x, y). It is thus possible to form a gamma image M that corresponds to all of the interactions detected during the acquisition period by all of the pixels. The gamma image M is defined according to coordinates (x, y) parallel to the detection surface 12, each coordinate (x, y) corresponding to one pixel of the gamma image. Each point M(x, y) of the gamma image M corresponds to a quantity of interactions assigned to a pixel 12, of coordinates (x, y) on the detection surface 12. The gamma image may be formed for all energy bands. Preferably, a gamma image is formed respectively in various energy bands. FIG. 2A shows one example of a gamma image acquired by a gamma camera, in a spectral band centered on the energy 662 keV, which corresponds to the emission energy of $^{137}$Cs. This is also referred to as a raw image, because it is an image resulting from the detection of interactions by pixels.

The gamma camera 1 comprises a processing unit 17 configured to form an object image O based on the gamma image M. The formation of the object image follows a reconstruction algorithm, taking into account the response function of the gamma camera, in particular of the collimator. The object image is defined in various pixels. Each pixel corresponds to a position in the field of observation. In the example described, the field of observation Ω is assimilated to a surface $S_\Omega$, this being normal. Each pixel of the object image O thus corresponds to a position on the surface $S_\Omega$. The value of each pixel corresponds to a photon emission intensity, that is to say a quantity of photons emitted per unit of time.

FIG. 2B shows the object image O obtained by applying a reconstruction algorithm to the gamma image M shown in FIG. 2A. FIG. 2B shows two hotspots $P_1$, $P_2$. A hotspot is understood to mean a region of the image comprising multiple adjacent pixels the emission intensity of which is greater than that of pixels arranged around the region. An object image, or reconstruction image, generally consists of a background, the intensity level of which may be variable but relatively low. It may comprise one or more hotspots $P_k$ extending over multiple pixels, or even tens or hundreds of pixels, the intensity of which is greater than the background.

The response function of the gamma camera is known. Therefore, for a given object image, in the field of observation, it is possible to obtain, by projection, a simulation of the gamma image $\hat{M}$ acquired by the gamma camera. The principle of the reconstruction is to minimize a difference between the projection $\hat{M}$, that is to say the simulated gamma image, and the gamma image M acquired by the gamma camera. The image M is a measured datum. The image $\hat{M}$ is a simulated datum obtained by projecting an object image O corresponding to a spatial distribution of radiation sources into the object field.

The reconstruction algorithm aims to minimize a cost function, corresponding to an error between M and $\hat{M}$. An MLEM (maximum likelihood expectation maximization) method may be used. In this case, the cost function is:

$$D(M:\hat{M}) = \sum_{pixels} \left( M \cdot \ln\left(\frac{M}{\hat{M}}\right) - M + \hat{M} \right) \tag{1}$$

where $\hat{M}$ corresponds to the estimate of the gamma image acquired by the gamma camera corresponding to the field of observation defined by a reconstructed image O. The objective of the reconstruction is to estimate the reconstructed image O for which the cost function is at a minimum.

In expression (1), the cost function is a Kullback-Leibler divergence. Another type of cost function may be used, for example a minimum mean square error:

$$\varepsilon(M:\hat{M}) = \sum_{pixels} (M - \hat{M})^2 \quad (2)$$

As indicated in the prior art, some hotspots may result from reconstruction artifacts, or from the influence of radiation sources outside the field of observation. Such hotspots are not physically tangible. The processing unit 17 implements processing, the main steps of which are shown schematically in FIG. 3. Steps 100 and 110 are conventional. The implementation of the invention corresponds to steps 120 to 180.

Step 100: acquiring the gamma image M.

Step 110: reconstructing the image O of the field of observation. This step is implemented by minimizing a cost function, as described in connection with (1) and (2). The reconstructed image corresponds to the object image. This step aims to invert a direct model, the direct model establishing a relationship between the position of hotspots in the field of observation and their detection by a gamma camera, having a response function.

If F designates the response function of the gamma camera, the direct model is such that:

$$M(x, y) = \sum_{u,v} F(x - u, y - v)O(u, v)$$

where x and y are pixel coordinates of the gamma camera u and v are coordinates in the field of observation O represents the image of the field of observation;

F is the response of the gamma camera.

The reconstruction of the image of the field of observation O aims to invert the direct model.

The European patent application filed under number EP No. 22184628 describes the principles of image reconstruction in the case of a gamma camera with a coded-aperture mask collimator. See in particular the description of step 130 in patent application EP No. 22184628.

Step 120: segmenting the hotspots.

In the course of this step, the reconstructed image O is segmented so as to separate various regions of interest $ROI_k$ corresponding respectively to various hotspots $P_k$ from one another. Each region of interest contains pixels, adjacent to one other, the intensity of which is comparable or considered to be comparable. k is an integer corresponding to a rank of each region of interest $ROI_k$. The segmentation is carried out using a dedicated algorithm, for example a watershed algorithm, advantageously preceded by a low-pass filter.

Figure 2C:
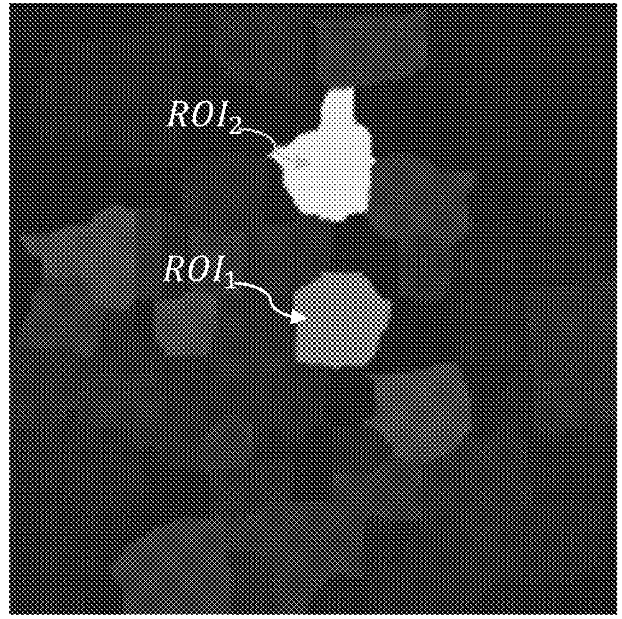
FIG. 2C is a segmented image of FIG. 2B.

FIG. 2C shows a segmentation of the reconstructed image of FIG. 2B. It is possible to see two regions of interest $ROI_1$, $ROI_2$ corresponding respectively to the two main hotspots $P_1$, $P_2$ seen in FIG. 2B. Each region of interest is assigned an intensity, corresponding for example to the maximum intensity among the intensities of the pixels belonging to the region of interest, or the sum or the average of the intensities of the pixels in the region of interest under consideration. This makes it possible to rank the various regions of interest according to their respective intensity. FIG. 2C also shows secondary regions of interest. The grayscale level assigned to each region of interest corresponds to the intensity of the region of interest. The rank k of a region of interest is then higher the lower the intensity of the region of interest.

Step 130: selecting a region of interest.

In the course of this step, one of the regions of interest $ROI_k$ is selected. Preferably, only one region of interest is selected.

Step 140: correcting the reconstructed image in the selected region of interest.

A corrected reconstructed image $O_k$ is then formed, corresponding to the reconstructed image O, in which, in the region of interest $ROI_k$, the pixels are replaced by a background value. This is equivalent to applying a mask to the reconstructed image O, the mask corresponding to the region of interest $ROI_k$ resulting from the segmentation. In the reconstructed image O, the content of the region of interest $ROI_k$ is replaced by a background value, representative of a background of the reconstructed image O. Thus, in the region of interest $ROI_k$, the value of each pixel in the reconstructed image O is replaced by the background value. The background value may be a uniform value, corresponding to the average of the reconstructed image O. The background value may also be obtained by extrapolation from the pixels of the reconstructed image O delimiting the region of interest. The background value may also be an arbitrary value defined by a user.

It will be understood that segmenting the reconstructed image makes it possible to delimit a region of interest, so as thereafter to be able to modify the value of the pixels of the reconstructed image in the selected region of interest.

FIG. 4A shows a corrected reconstructed image $O_1$(k=1). This image was obtained by assigning, in the image O shown in the image 2A, the pixels belonging to the region of interest $ROI_1$ shown in the segmented image of FIG. 2B, a value corresponding to the average value of the image O. FIG. 4A shows the contour of the region of interest under consideration in dotted lines.

Step 150: Projection

In the course of this step, a gamma image $\hat{M}_k$ that would be acquired by the gamma camera if the field of observation were defined by the corrected image $O_k$, that is to say in the absence of the hotspot $P_k$ corresponding to the region of interest $ROI_k$, is obtained. This step is carried out taking into account the response function of the camera. FIG. 4B shows the gamma image $\hat{M}_1$ obtained by applying the response function of the gamma camera to the object image $O_1$ shown in FIG. 4A. Simulating a gamma image is equivalent to applying the direct model defined in step 130.

FIG. 4C shows the image $\hat{M}_0$ that corresponds to the image considered to be closest to the image M acquired by the gamma camera, shown in FIG. 2A, during the reconstruction of the image O. $\hat{M}_0$ is a model of the gamma image acquired by applying the response function of the gamma camera to the image O shown in FIG. 2B. The comparison between the acquired image M and the image $\hat{M}_0$ shows that the acquired image M is more grainy, due to the pitch of each pixel, than the image $\hat{M}_0$, the latter resulting from a computation. Therefore, the image $\hat{M}_0$ corresponds to an image approximating the image M, without being identical thereto.

It may be seen that the image $\hat{M}_1$ is significantly different from the image $\hat{M}_0$. This indicates qualitatively that, by removing the region of interest $ROI_1$, the image acquired by the gamma camera would be significantly different from the acquired image M, since $\hat{M}_0$ is an image considered to be approximating M. The fact that $\hat{M}_1$ is different from $\hat{M}_0$ suggests that the hotspot corresponding to the region of interest $ROI_1$ is real.

Step 160: Comparing $\hat{M}_k$ and M

The objective of this step is to carry out a comparison between M and $\hat{M}_k$.

The total intensity of the gamma image $\hat{M}_k$ resulting from the step is only able to be less than the total intensity of the gamma image M acquired in step 100. This is due to the fact that the total intensity of the corrected image $O_k$ is less than the total intensity of the reconstructed image O following the removal of the hotspot $P_k$. The total intensity of an image is understood to mean the sum of the pixels of the image.

In order to be able to be compared with the acquired image M, a registration is applied to the image $\hat{M}_k$ such that, after the registration, the total intensity of the image $\hat{M}_k$ corresponds substantially to the total intensity of the image M. Substantially is understood to mean to within a tolerance, for example to within ±10%.

In order to carry out such a registration, a parametric registration function $f_k$, which is for example polynomial, is taken into account. The parameters $\theta_k$ of the function for which the registered image $f_k(\hat{M}_k)$ is closest to the acquired image M are then determined.

The difference may be quantified by the Kullback-Leibler divergence, in which case it corresponds to the expression:

$$Dmin, k = \min\theta kD(M:fk(Mk))D_{min,k} = \min_{\theta_k} D(M:f_k(\hat{M}_k)) \tag{3}$$

where D corresponds to the Kullback-Leibler divergence operator explained in (1)

The polynomial function $f_k$ is for example a linear function, parameterized by a gain $a_k$ and a bias (or offset) $b_k$. In this case, it is necessary to determine the parameters $a_k$ and $b_k$ that minimize a difference between $\hat{M}_k$ and M. In this case, (3) becomes:

$$D_{min,k} = \min_{\theta_k} D(M:a_k\hat{M}_k + b_k) \tag{4}$$

(4) may be minimized iteratively using an iterative scaling algorithm. In the course of each iteration n (n>1), the values of the parameters $$a_k^n$$

and $$b_k^n$$

are updated according to the expressions:

$$a_k^n = a_k^{n-1} \frac{\sum_{pixels} \hat{M}_k \frac{M}{a_k^{n-1}\hat{M}_k + b_k^{n-1}}}{\sum_{pixels} \hat{M}_k} \tag{5}$$

$$b_k^n = b_k^{n-1} \frac{\sum_{pixels} \frac{M}{a_k^{n-1}\hat{M}_k + b_k^{n-1}}}{N_{pixels}} \tag{5'}$$

where $N_{pixels}$ corresponds to the number of pixels in the gamma image.

The iterative algorithm is initialized from arbitrary values $$a_k^{n=0}$$

and $$b_k^{n=0},$$

for example equal to 1.

At the end of this step, there is a registered image $f_k(\hat{M}_k)$ that is as close as possible to the gamma image M in terms of pixel intensity.

The registration may be carried out more simply by comparing the respective intensities of the gamma images M and $\hat{M}_k$, and by randomly distributing the differential of the intensities in the image $\hat{M}_k$, such that the total intensities of each image are equal. Such a simpler embodiment is however less precise.

Step 170: Computing a discriminating factor.

In the course of step 170, it is sought to estimate whether the image $$\hat{M}_k$$

, after registration by the registration function $f_k$, is statistically separable from the image M.

$$\hat{M}_k^*$$

denotes the registered image $$\hat{M}_k.$$

$$\hat{M}_k^* = f_k(\hat{M}_k)$$

This step comprises computing a discriminating factor, or Bayes factor $\lambda_k$, such that:

$$\lambda_k(M) = \log\frac{p(M|\hat{M}_0)}{p(M|\hat{M}_k^*)} \tag{6}$$

$$\hat{M}_0$$

corresponds to the estimate of M when the reconstructed image is the image O resulting from step 110, with all of the hotspots.

$$\hat{M}_0$$

is obtained by applying the response function of the gamma camera to the reconstructed image O. This is the image shown in FIG. 4C.

$$p(M\mid \hat{M}_0)$$

corresponds to a probability of observing M when the reconstructed image is the image O;

$$p(M\mid \hat{M}_k^*)$$

corresponds to a probability of observing M when the reconstructed image is the corrected image $O_k$ resulting from step 140, taking into account the registration carried out in the course of step 160.

$\lambda_k(M)$ may be estimated using the Kullback-Leibler divergence:

$$\lambda_k(M)=D(M:\hat{M}_k^*)-D(M:\hat{M}_0)$$

where D is the Kullback-Leibler divergence operator explained in (1).

hence:

$$\lambda_k(M)=\sum_{pixels}\left(M\ln\left(\frac{\hat{M}_0}{\hat{M}_k^*}\right)-\hat{M}_0+\hat{M}_k^*\right) \tag{8}$$

The higher the discriminating factor $\lambda_k(M)$, the lower the probability $$p(M\mid \hat{M}_k^*)$$

compared to $$p(M\mid \hat{M}_0).$$

The higher $\lambda_k(M)$, the more the hotspot $P_k$ should be considered to be a "true positive". Conversely, the lower $\lambda_k(M)$, the more the hotspot $P_k$ tends to be considered to be a false positive. Thus, the higher $\lambda_k(M)$, the higher the confidence level able to be assigned to the hotspot corresponding to the region of interest $ROI_k$. When $\lambda_k$ (M)=0, the probability of the hotspot $P_k$ being a false positive is equal to that of it being a true positive.

The discriminating factor thus makes it possible to quantify a confidence level assigned to the hotspot $P_k$ corresponding to the region of interest $ROI_k$.

Step 180: computing a probability

As indicated above, the discriminating factor $\lambda_k(M)$ represents a factor for discriminating between two probabilities. Based on $\lambda_k(M)$, it is possible to compute a coordinate $x_k$, such that:

$$x_k=\frac{\lambda_k(M)}{\sqrt{|\lambda_k(M)|}} \tag{10}$$

It is possible to estimate a probability based on the coordinate xx according to a probability function, for example such that:

$$P(x_k)=\frac{1}{2}(1+\operatorname{erf}(x_k-\beta) \tag{11}$$

β is an offset value (bias) corresponding to an accepted false positive rate.

Using the function *erf* (primitive of the Gaussian) makes it possible to obtain a probability according to a Gaussian distribution law.

Steps 130 to 180 may be reiterated by selecting, in each iteration, one and preferably only one different region of interest. According to one possibility, steps 130 to 180 are carried out in descending order of the intensity assigned to each region of interest: they are first implemented starting with the most intense hotspots.

FIG. 4D shows a corrected reconstructed image $O_2$ (k=2). This image was obtained by assigning, in the image O shown in the image 2A, the pixels belonging to the region of interest $ROI_2$, shown in the segmented image of FIG. 2B, a value corresponding to the average value of the image O. FIG. 4D shows the contour of the region of interest under consideration in dotted lines. FIG. 4E shows the image $\hat{M}_2$ corresponding to the gamma image obtained by applying the response function of the gamma camera to the image $O_2$ shown in FIG. 4D. It may be seen that the image $\hat{M}_2$ is closer than the image $\hat{M}_1$ to the image $\hat{M}_0$. This indicates qualitatively that, by removing the region of interest $ROI_2$, the image acquired by the gamma camera varies to a lesser extent than by removing the region of interest $ROI_1$. The confidence level able to be assigned to the hotspot $P_2$ is therefore lower than the confidence level able to be assigned to the hotspot $P_1$ FIG. 5 shows the function $P(x_k)$ as explained in (11). Other strictly increasing types of function may be used instead of the function *erf*, for example a sigmoid function, an arctangent function, a hyperbolic tangent function, etc. In FIG. 5, consideration has been given to β=0 (curve a). Curve b corresponds to β=10. In FIG. 5, the x-axis corresponds to the value $x_k$ and the y-axis corresponds to the probability of the hotspot being present.

The inventor implemented the invention on images acquired by a gamma camera with coded-aperture masks. FIG. 6A shows an image, acquired in the laboratory, of point sources of $^{137}Cs$. The indicated dose rate values correspond to contact measurements. A confidence level was assigned on each source. Hotspots with the lowest confidence levels result from reconstruction artifacts: they are not physically tangible. The invention makes it possible not to take these into account. It will be understood that the invention is particularly useful when the gamma camera implements a coded-aperture mask collimator.

FIGS. 6B and 6C are images taken on a nuclear installation in the presence of strong scattered radiation. In this type of environment, the invention may make it possible, depending on the confidence level, to distinguish between a real hotspot, a hotspot formed on the reconstructed image under the combined effects of scattering, potential radiation sources outside the field of observation, and reconstruction artifacts. In FIGS. 6B and 6C, applying the invention makes it possible not to take into account hotspots the associated probabilities of which are low.

The invention claimed is:

1. A method for obtaining and processing an image acquired by a gamma camera, the gamma camera comprising a detector configured to detect X-ray or gamma-ray photons emitted in a field of observation of the gamma camera, the method comprising:

a) forming a gamma image using the gamma camera, the gamma image corresponding to positions of interactions detected by the detector during an acquisition period;

b) based on the gamma image, taking into account a response function of the gamma camera to reconstruct an image, the reconstructed image being defined in pixels, each pixel corresponding to a position in the field of observation, a value of each pixel corresponding to a photon emission intensity at said position, the image reconstruction being carried out by processing circuitry implementing a reconstruction algorithm;

c) segmenting the reconstructed image into regions of interest (ROI), each region of interest comprising adjacent pixels, the intensity of which is considered to be homogeneous, and greater than a background level of the reconstructed image, each region of interest defining a region of the reconstructed image corresponding to a radiation zone referred to as a hotspot;

d) selecting a region of interest from the regions of interest defined in c);

e) correcting the reconstructed image, within the region of interest selected in d), by replacing the value of the pixels with a predetermined value or a value representative of the background level of the reconstructed image;

f) using the response function of the gamma camera, and the corrected reconstructed image resulting from e), simulating, using the processing circuitry, a gamma image that would be acquired by the gamma camera in absence of the hotspot in the selected region of interest;

g) using the response function of the gamma camera, simulating, using the processing circuitry, a gamma image acquired by the gamma camera based on the reconstructed image resulting from b); and h) comparing the gamma images resulting from f), g), and a) so as to compute a probability of the hotspot being present in the selected region of interest.

2. The method as claimed in claim 1, wherein step f) further comprises:

f-i) using the processing circuitry, applying the response function of the gamma camera to the corrected reconstructed image, resulting from e), to obtain an estimate of the image that would be acquired by the gamma camera in the absence of the hotspot in the selected region of interest; and f-ii) applying a registration to the image estimated in f-i) so as to obtain a registered image, the total intensity of which is substantially equal to the intensity of the image acquired in step a), the registered image forming the gamma image that would be acquired by the gamma camera in the absence of the hotspot in the selected region of interest.

3. The method as claimed in claim 2, wherein the registration is carried out by applying a registration function to the image estimated in sub-step f-i).

4. The method as claimed in claim 3, wherein the registration function is polynomial and parameterized by parameters, the value of the parameters being determined so as to minimize a difference between the registered image and the gamma image resulting from step a).

5. The method as claimed in claim 3, wherein the registration function is a linear function parameterized by a gain parameter and a bias parameter.

6. The method as claimed in claim 1, wherein step h) comprises:

computing a discriminating factor, the discriminating factor corresponding to a comparison between:

the probability of obtaining the gamma image acquired in a) when the reconstructed image is the image obtained in step b); and the probability of obtaining the gamma image acquired in a) in the absence of the hotspot corresponding to the region of interest selected in c); and computing the probability of the hotspot being present in the region of interest selected in c) based on the discriminating factor.

7. The method as claimed in claim 1, wherein:

step c) comprises determining an intensity level in each region of interest; and steps c) to h) are implemented successively, by successively selecting each region of interest in order of decreasing intensity level.

8. The method as claimed in claim 1, wherein the gamma camera is a Compton gamma camera or comprises a coded-aperture mask collimator.

9. A gamma camera to detect a presence of radiation sources in a field of observation, the gamma camera comprising:

a detector material, segmented into various pixels;

a memory to store a quantity of interactions detected in the course of an acquisition period and respectively assigned to each pixel; and the processing circuitry, configured to process the interactions stored in the memory, the processing circuitry being configured to implement steps b) to h) of the method as claimed in claim 1 based on the interactions detected and stored in the memory.

10. The gamma camera as claimed in claim 9, further comprising a coded-aperture mask collimator defining the field of observation of the gamma camera.

11. The gamma camera as claimed in claim 9, wherein the gamma camera is a Compton gamma camera.

* * * * *